United States Patent [19]

Elrod et al.

[11] Patent Number: 4,954,155
[45] Date of Patent: Sep. 4, 1990

[54] SONIC GELLING OF CLAY IN SUSPENSION FERTILIZERS

[75] Inventors: Jimmie L. Elrod; Robert G. Lee, both of Killen, Ala.

[73] Assignee: Tennessee Valley Authority, Muscle Shoals, Ala.

[21] Appl. No.: 178,726

[22] Filed: Apr. 6, 1988

[51] Int. Cl.$^5$ ............................ C05C 9/00; C05G 3/00
[52] U.S. Cl. .......................................... 71/28; 71/29; 71/30; 71/34; 71/64.08
[58] Field of Search .......................... 71/11, 27, 28–30, 71/33, 34, 64.08

[56] References Cited

U.S. PATENT DOCUMENTS 3,997,636  12/1976  Bennett ................................. 264/7
4,134,750  1/1979   Norton .................................. 71/29

Primary Examiner—Ferris H. Lander
Attorney, Agent, or Firm—Robert A. Petrusek

[57] ABSTRACT

The instant invention relates to a method utilizing relatively high frequency oscillations for dispersing channelized 2:1 clays during the production of fertilizer suspensions to therein form gels as opposed to the use of mechanical energy such as, for example, that imparted by a pump or agitator. The instant sonic gelling method is effective for use with all fertilizer suspension systems containing the channelized 2:1 clays, sepiolite or attapulgite. The method involves situating the fluid fertilizer-clay mixture to be gelled in juxtaposition with ultrasonic (i.e., sonic) energy generating means. In a fashion somewhat similar to ultrasonic cleaning methods, it has now been found that sound waves striking clay particles (crystal agglomerates) in aqueous fertilizer solutions impart sufficient energy to the particles to break them down into their component individual, needlelike crystals, thereby forming a gel to increase the viscosity of the solution, and to effect the formation of a suspension capable of preventing the settling of various crystalline fertilizer salts up to about 20 mesh (850 microns) in size.

4 Claims, 4 Drawing Sheets

4,954,155

SONIC GELLING OF CLAY IN SUSPENSION FERTILIZERS

INTRODUCTION

The present invention relates to a new, novel, and relatively simple and inexpensive, as well as highly efficient method and technique for dispersing channelized 2:1 clays in fertilizer suspensions through the use of sonic energy, rather than mechanical energy, to therein form gels. The technology of suspension fertilizers was developed, and the commercial practice of suspension production became widespread, because of certain inherent advantages of suspensions over clear solution liquid fertilizers. These advantages include higher concentrations for the suspensions and the ability to use lower purity, and therefore more economical, raw materials. Higher concentrations, or grades, are possible because of the ability to suspend crystals of up to 20 mesh in size; i.e., all the plant nutrient compounds do not have to be dissolved. Likewise, raw materials with insoluble contaminants, such as phosphates made from wet-process phosphoric acid, may effectively be utilized because the insoluble compounds therein do not settle in suspensions to thereby form troublesome sludges in the bottom of storage tanks, applicator vessels, etc.

The ability of the suspensions to prevent settling of contained solids is attributed to their non-Newtonian flow properties. By proper treatment during production of the suspensions with a suspending agent, such as for example, attapulgite clay, a rheological state is achieved in which flow does not occur until a critical shear stress, the yield stress, is exceeded. In properly made suspensions, the yield stress is greater than the gravitional force on the suspended solid particles, thus preventing settling.

Attapulgite clay is by far the most widely used suspending agent for fertilizer suspensions. It is mined and processed in the southern Georgia-northern Florida area and shipped to users in the form of a dry powder. The dry clay must be properly dispersed and gelled in the suspensions to achieve satisfactory suspending ability. To gel the clay, the small clay particles, which are typically −200 mesh (75 microns), must be separated into their individual needlelike mineral crystals which are typically about one micron long. This is performed in the practice of present technology by applying shear energy to the fluid to be processed into a suspension, after addition of the dry clay to the clay-fluid fertilizer mixture. Mechanical agitators and recirculation pumps with high-shear-type impellers are used by the industry to effect the desired dispersion and gelling.

A principal characteristic of most suspension fertilizer nutrient materials is that they are practically all (except urea) ionic salts. When added in dry form, however, attapulgite clay strongly resists forming a gel in the presence of all but very dilute concentrations of ionic salts. This resistance to gelling can be overcome by a high enough input of shear energy into the system. In addition, it is known that the presence of relatively large amounts of solids (undissolved nutrient salts) in the fluid, greatly assists the action of an agitator or pump in shearing the clay to promote gelling, presumably by means of such particles mechanically impinging and/or impacting upon the clay particles to thereby cause same to be broken down from their agglomerated state. In fact, in present commercial practiced methods for preparing same, dry clay cannot be used unless large amounts of yet-undissolved solids are present when the clay is added. The crystal loading in typical suspension products prepared in the industry ranges from about 5 percent up to about 40 percent of the weight of the product. An alternative to this approach is to predisperse the clay in water. This method also requires the use of high-shear mixing, but the resulting clay-water dispersion will give satisfactorily strong gels in ionic fertilizer solutions without the aforementioned requirement of having therein substantial amounts of undissolved solids to enhance the input mechanical shear energy.

BACKGROUND OF THE INVENTION

1. Field of the Invention

The present invention relates to a new and novel method of dispersing channelized 2:1 clays (attapulgite and sepiolite) and breaking down the clay particles to form gels in fertilizer suspensions. The invention consists of using sonic energy, rather than mechanical energy such as that imparted by a pump or agitator, to create the necessary gel. As stated supra, the instant sonic gelling method is effective for use with all sepiolite or attapulgite containing fertilizer suspensions, including systems containing ionic, and/or anionic materials, having solids as well as no solids, and having dry or predispersed fluid-clay materials used in their manufacture. The present invention is particularly effective and applicable for use with systems where dry clay is added to ionic solutions without undissolved solids present, i.e., systems otherwise of a type in which mechanical shear requirements are prohibitive in terms of energy and retention time.

2. Description of the Prior Art

Some investigators have discovered used of sonic agitation which result in reduction of particle size of solids contained in fluid media. Thus, in his U.S. Pat. No. 4,412,842, Klayer, Nov. 1, 1983, obtained size reduction of coal slurred in water. Treatment of clay suspensions with ultrasonic energy has been studied in drilling mud applications. Kruglitskii et al, in Ukr. Khim. Zh. (Russ. Ed.), 40 (2), 141–145, 1974 stabilized montmorillonite suspensions with ultrasound and a water-soluble acrylic polymer. In studies of the present invention, we found that the sodium bentonite form of montmorillonite did not respond to ultrasound by forming a gel and was thus unsuitable for the method of the present invention. This result was expected because sodium bentonite swells when mixed with water rather than gelling by breaking apart of the clay particles as do, for example, attapgulgite and sepiolite.

Also, Kruglitskii et al (Tr. Ukr. Nauch.-Tekh. Konf. Termo-Soleustoichivym Promyvochnym Zhidtk Tamponazhnym Rastvoram, 1st, Meeting Date 1968, Volume 1, 185–92. Edited by: Kruglitskii, N. N. "Naukova Dumka": Kiev, Ukr. SSR.), treated palygorskite as well as montmorillonite with ultrasound to improve the physical-mechanical properties of drilling fluids. Kruglitskii stabilized a 10 percent (by weight) palygorskite suspension in water with the addition of up to 0.1 percent (by weight) NaOH and the use of ultrasound. Kruglitskii does not described the methods or type of ultrasonic equipment used, nor is the palygorskite further identified as to source. A sonification time of 8 minutes, however, was required to achieve maximum stabilization, and furthermore no improvement, in fact, even a slight decrease in stability, was obtained during the first 4 minutes as indicated by the curve in Kurglitskii's first graph. Whether this long retention time and lack of result during its first half was due to the relatively high clay concentration (the experimental drilling fluids were intended for use in deep and super-deep oil and gas wells) is unknown. Based on results of tests made in developing the present invention and described below, however, it is possible that Kruglitskii's procedure employed an insufficient power density (watts per milliliter of clay-water mixture) because the method, clay, and power density levels of the present invention result in an increasing clay gelling action beginning practically instantly after starting sonification. This rapid response is illustrated in FIG. 1 infra, showing the increase in viscosity due to sonic irradiation of a mixture containing 3 percent attapulgite clay in 10-34-0 grade ammonium polyphosphate solution fertilizer. (The procedure used in obtaining the data for this graph is described more fully in Example I, infra.) FIG. 1 is also introduced and discussed more fully infra. Thus, it is shown that the sonic treatment immediately began gelling the clay and increased the viscosity from about 50 (54) centipoises to about 80 centipoises in only 5 seconds and further to about 250 (244) centipoises in only 20 seconds. The usefulness of this rapid response, which is obtained following the teaching of the instant invention and which results in shorter retention times which, in turn, means that smaller vessels can be used, can be easily appreciated by all those skilled in this art. Obviously, similar teachings were not indicated in the results of Kruglitskii.

Agabal'yants, in Kim Teknol. (Kiev), (1), 13–15, 1975 used sonification as an alternative to chemical treatment to stabilize palygorskite drilling mud. He indicated that he obtained dispersion of the clay and increased viscosity after a period of 6 minutes retention time and at a concentration of 10 percent clay with the further proviso that no dissolved salts were present in the mud. The principal purpose and objective of his experiment was to avoid the use of expensive chemical treatment for stabilization. Thus the results of Agabal'yants do not infer or indicate that sonification would be useful for the preparation of fertilizer suspensions, which always contain high levels, usually saturation levels, of highly soluble ionic fertilizer salts (dissolved). As indicated supra, attapulgite clay strongly resists gelling in the presence of ionic solutes.

SUMMARY OF THE INVENTION

The instant invention relates to a new, improved, and superior method for gelling attapulgite or sepiolite clay. the modus operandi of the present invention involves placing the fluid fertilizer-clay mixture to be gelled into or passing it at a controlled rate through a vessel into or onto which a sonic energy generating device is inserted or attached. The frequency of the sound energy used in our practice of the instant invention was 20,000 Hz. Undoubtedly, other frequencies could be used in applying the principle of this invention. The gist underlying the concept of our invention is the effect of sound energy in a fluid medium on samll solid particles therein, such as in the use of ultrasonic cleaning methods. In ultrasonic cleaning, small particulate solids (dirt) are detached from surfaces to which they adhere and are dispersed through the cleaning solvent by the action of ultrasonic frequency sound waves passed through the solvent. In a similar fashion, sound waves striking clay particles (crystal agglomerates) in aqueous fertilizer solutions impart sufficient energy to the particles to break them down into their component individual, needlelike crystals, thereby forming a gel and increasing the viscosity of the solution, converting it into a suspension capable of preventing the settling of various crystalline fertilizer salts up to about 20 mesh (850 microns) in size.

We have found that in most fertilizer suspension systems the use of sonic energy is a more efficient means of gelling the clay, sometimes vastly so, because little or no energy is used for bulk movement, or pumping, of the liquid such as is unavoidable when using mechanical shearing equipment. It is a characteristic of pumps and agitators that a large proportion of the energy they use goes into bulk movement of the fluid, with shear occurring only within the very immediate vicinity of the impeller or turbine.

Since little or no sonic energy is used for bulk fluid movement, the efficiency of energy use can be vastly greater than that of mechanical shear in many suspension systems. In gelling attapulgite added dry to 32-0-0 grade urea-ammonium nitrate (UAN) solution, for example, about 20 times more energy is required for mechanical shearing than for sonic shearing. Also, the sonic energy can be applied in a much more concentrated fashion, e.g., 2 watts per milliliter (W/ml) compared with, typically, 0.003 W/ml for mechanical agitation. AS a result, the retention time required for gelling can be much lower, e.g., 20 seconds to sonically gel dry attapulgite in a 10-34-0 solution (10% N, 34% $P_2O_5$, 0% $K_2O$), as compared with 105 seconds for mechanical shear. The sizes of gelling vessels required are correspondingly smaller.

As will be seen infra, the present invention works well with both nitrogen and phosphate-based suspensions. Thus, dry clay can be added to and gelled in either a 32-0-0 grade UAN solution or a 10-34-0 grade ammonium polyphosphate solution, for example. Potassium chloride can be added to the above grades along with the clay to produce a wide variety and range of complete fertilizer suspension grades.

The present invention also works well with ammonium polyphosphate sulfate grades such as 11-30-0-3S. Since the sonic gelling method is effective whether or not ionic salts and undissolved solids are present, the dry clay may be added to batch mixing units, such as are commonly employed commercially in the suspension industry, at any point during the batch procedure. In summary, no limits seem to apply as to the type of fertilizer suspension systems that can be successfully used for sonic gelling of attapulgite.

OBJECTS OF THE INVENTION

It is therefore a principal object of the present invention to develop a new method using sonic energy rather than mechanical shear as a means of gelling channelized 2:1 clays in aqueous fertilizer solutions and suspensions. Another object of the present invention is to develop said new gelling method using sonic energy in which either dry or predispersed clays may be gelled in the presence of dissolved ionic fertilizer salts. A still further object of the instant invention is to develope said new sonic gelling method in which either the clay gelling times, or energy requirements, or both, can be substantially less than those of mechanical shear methods.

Still further and more general objects and advantages of the present invention will appear from the more detailed description set forth below, it being understood, however, that this more desired description is given by way of illustration and explanation only, and not necessarily by way of limitation since various changes therein may be made by those skilled in the art without departing from the true spirit and scope of the present invention.

BRIEF DESCRIPTION OF THE DRAWINGS

The present invention will be better understood from a consideration of the following description taken in connection with the accompanying drawings in which.

DETAILED DESCRIPTION OF THE DRAWINGS

Figure 1:
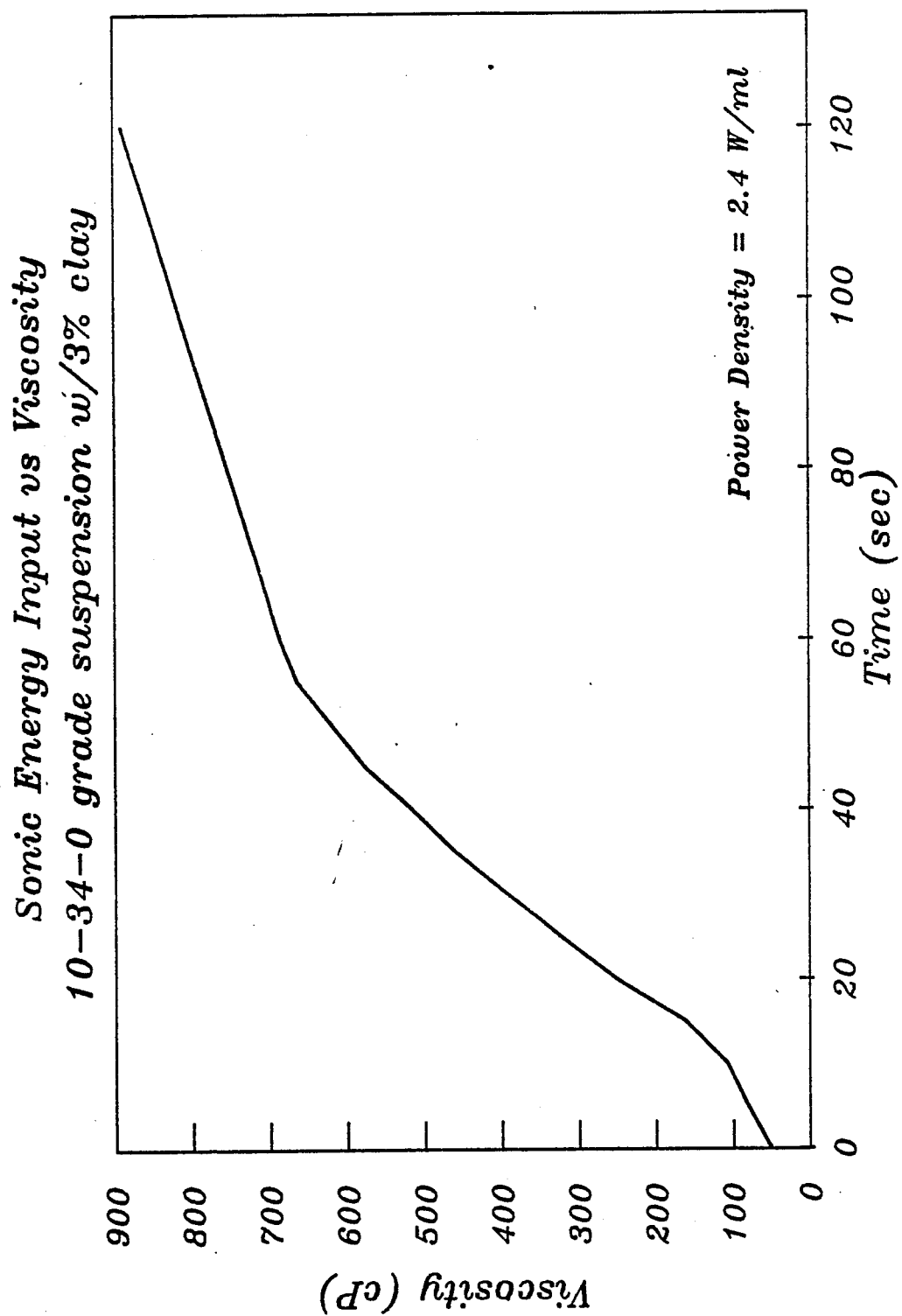
FIG. 1 graphically illustrates that sonic energy quickly causes gelling of attapulgite clay in producing a fertilizer suspension.

Referring first and now more specifically to FIG. 1, therein is shown in graphical form the effect of sonification on the viscosity of a 10-34-0 ammonium polyphosphate suspension containing 3 percent attapulgite clay. Using the methods described in greater detail below in combination with the description of Example I infra, it was found that a mixture of clay (3%) in 10-34-0 solution rapidly gained viscosity starting at 50 cP to almost 90 cP in only two minutes when subjected to sonification at a power density of 2.4 W/ml. The data utilized for preparing this plot are given below in Table I.

TABLE I

| At Power Density Equal to 2.4 Watts Per Milliliter (W/ml) | | | | | | | | | | | | | |
|---|---|---|---|---|---|---|---|---|---|---|---|---|---|
| Time (sec.) | 0 | 5 | 10 | 15 | 20 | 25 | 30 | 35 | 40 | 45 | 50 | 55 | 60 | 120 |
| Viscosity (cP) | 50 | 80 | 106 | 160 | 250 | 324 | 392 | 458 | 514 | 574 | 618 | 662 | 684 | 888 |

Referring now more specifically to FIG. 2, again using the method of Example I infra, the effect of power density was determined on the sonification time required to increase the viscosity of a UAN solution-clay (3%) mixture to 300 centipoises. It was found that, for the particular attapulgite used, the minimum practical power density was about 0.8 W/ml, requiring 12 minutes to gel the clay and increase the viscosity from 40 to 300 centipoises. The maximum practical power density was in the range of about 3 to 5 W/ml, requiring about 0.5 to 1.0 minutes to gel the suspension. The data utilized for preparing this plot are given below in Table II.

TABLE II

| Minimum Viscosity of About 250 Centipoises | | | | | | | | |
|---|---|---|---|---|---|---|---|---|
| Power Density (W/ml) | 0.8 | 0.86 | 1 | 1.2 | 1.4 | 1.75 | 2.29 | 4.6 |
| Time (min.) | 12 | 10 | 5 | 3 | 2.5 | 1.5 | 1 | 0.5 |

Figure 2:
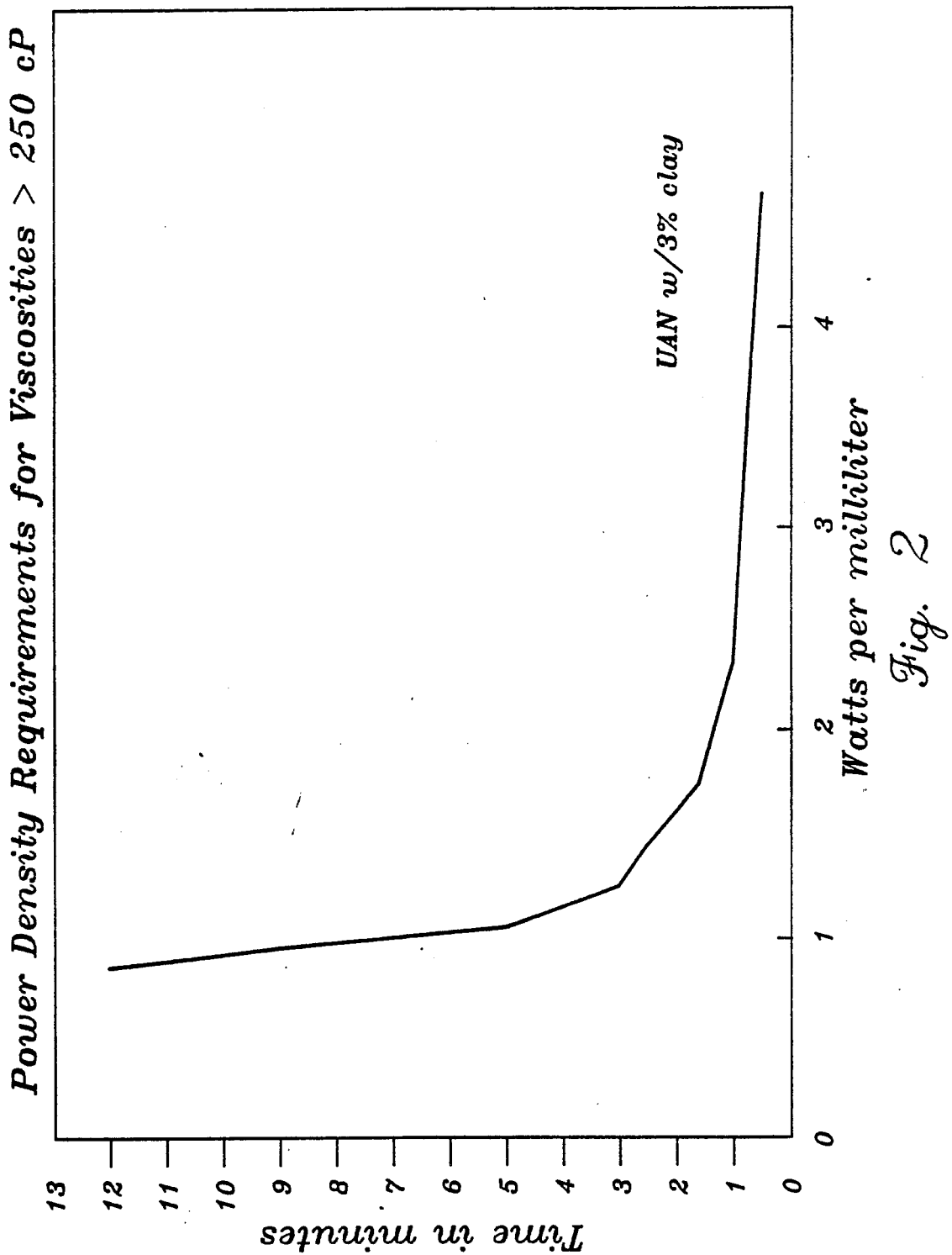
FIG. 2 graphically illustrates the effect of the lever of power applied as sonic energy on the retention time required for adequate gelling of a UAN suspension.
Figure 3:
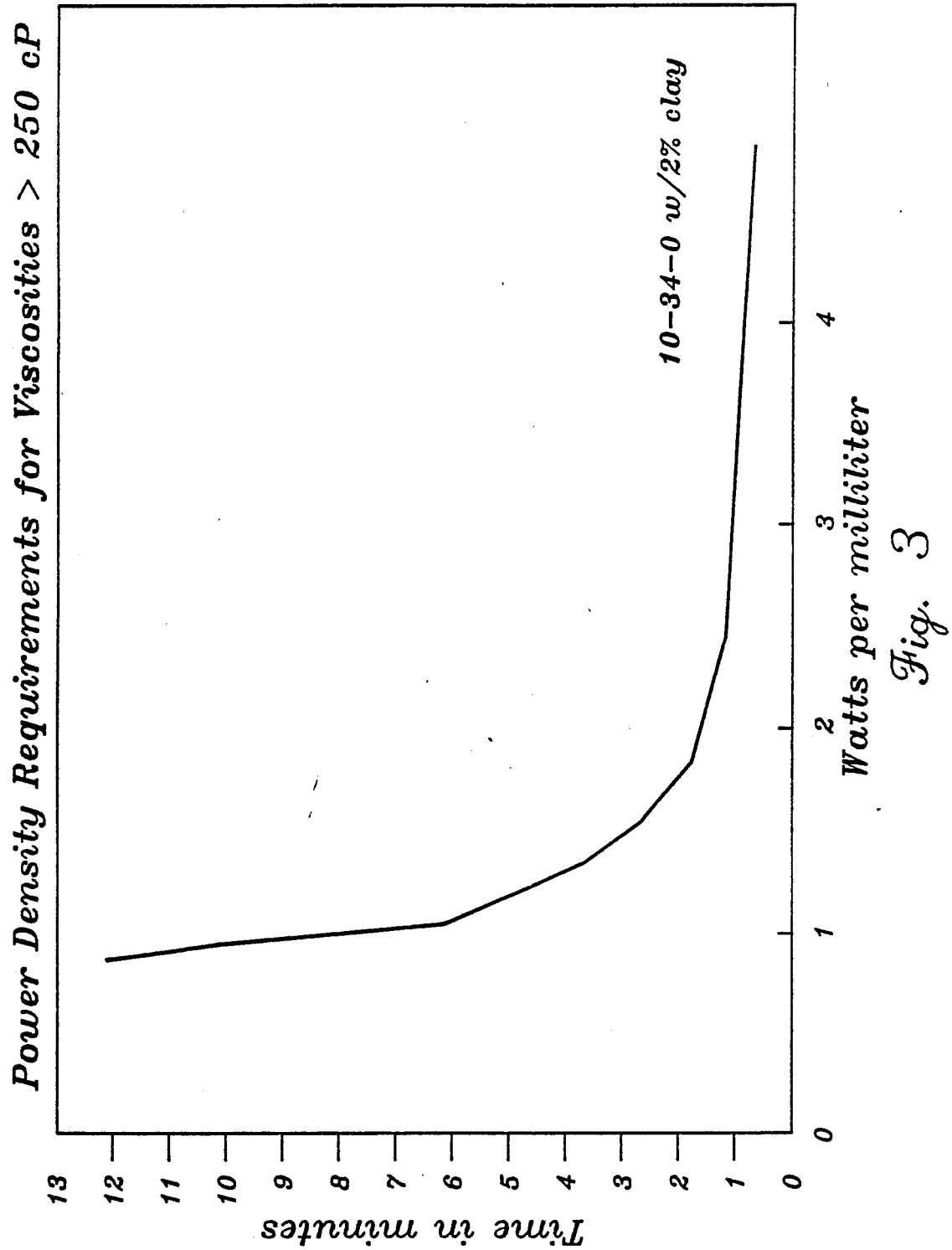
FIG. 3 graphically illustrates the principle of FIG. 2 as it may be applied to a phosphate suspension.

Referring now specifically to FIG. 3, almost identical results to those shown in FIG. 2 were obtained when the effect of power density was tested using a 10-34-0 solution containing 2 percent clay. The difference in composition of the fluid phases and the change from 3 percent to 2 percent clay had practically no effect on the sonic gelling results. This is greatly different from the case of mechanical gelling, in which dry clay takes vastly longer to gel when added to UAN solution than when added to 10-34-0 solution, as shown in Examples I and II below. The data utilized for preparing this plot are given below in Table III.

TABLE III

| Minimum Viscosity of About 250 Centipoises | | | | | | | | |
|---|---|---|---|---|---|---|---|---|
| Power Density (W/ml) | 0.85 | 0.9 | 1.06 | 1.27 | 1.48 | 1.85 | 2.42 | 4.84 |
| Time (min) | 12 | 10 | 6 | 3.5 | 2.5 | 1.5 | 1 | 0.5 |

Figure 4:
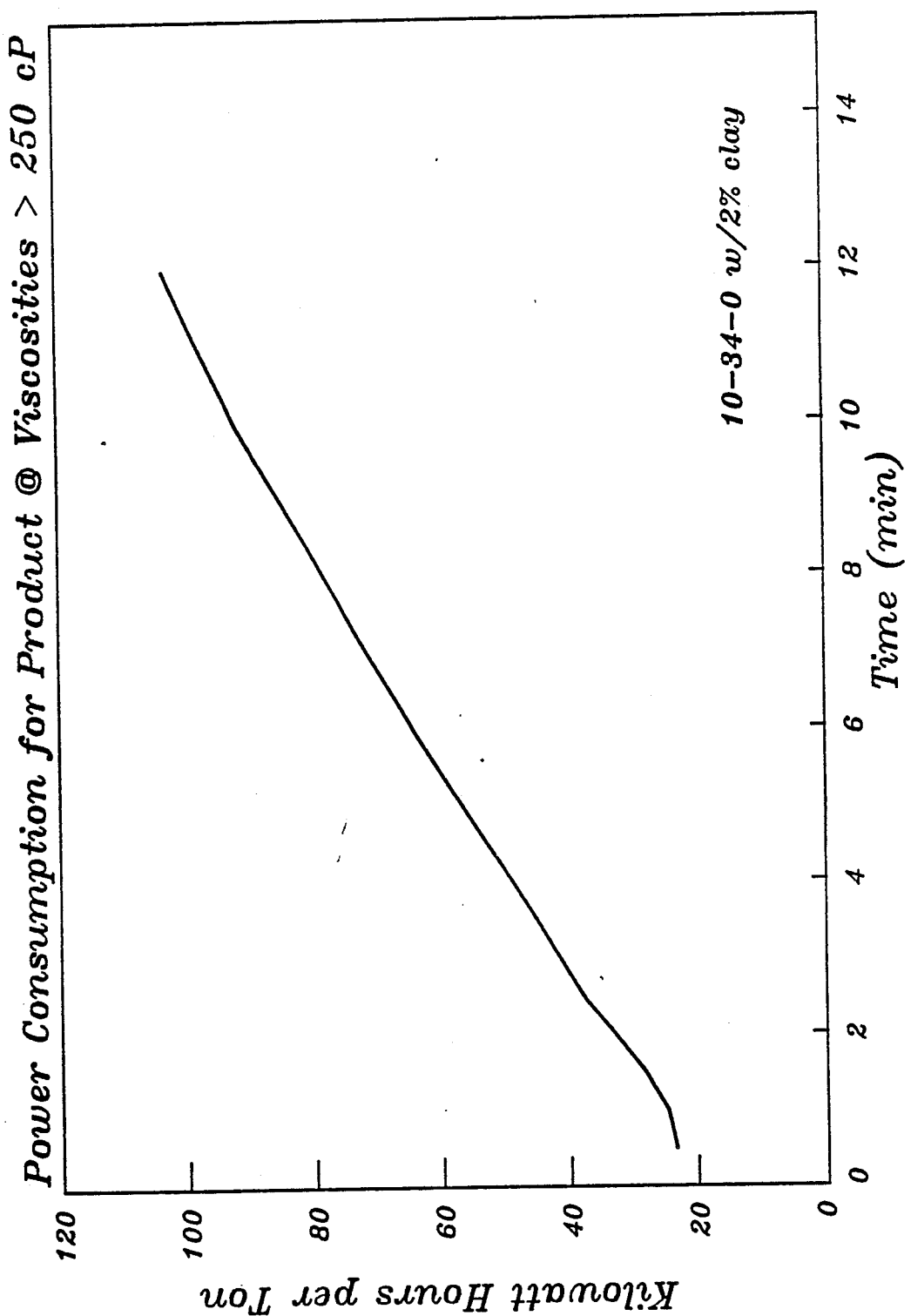
FIG. 4 graphically illustrates the total energy required in producing phosphate suspensions as a function of the retention time employed using the preferred embodiment of the invention.

Referring now specifically to FIG. 4, the data from FIG. 3 are presented in combination with factors for the quantity of suspension to show the total energy required in producing a 10-34-0 suspension (2% clay) of 250 centipoises viscosity at different retention times. The minimum energy is required at the shorter retention times, 0.5 to 1.0 minutes, corresponding to power density levels of about 2.4 to 4.6 watts per milliliter. As indicated below in Example II, substantially less energy is required than for mechanical gelling. The data utilized for preparing this plot are given below in Table IV.

TABLE IV

| Minimum Viscosity of About 250 Centipoises | | | | | | | | |
|---|---|---|---|---|---|---|---|---|
| Retention time (min) | 0.5 | 1 | 1.5 | 2.5 | 3.5 | 6 | 10 | 12 |
| Energy (kWh/ton) | 24.7 | 24.6 | 28.1 | 37.5 | 44.9 | 64.2 | 91.9 | 103 |

DESCRIPTION OF THE PREFERRED EMBODIMENTS

It may be safely stated that about 90 percent of all suspension fertilizers are made from only six principal ingredients, plus clay. These materials are UAN solution (32% N), commercial 10-34-0 solution from superphosphoric acid, solid monoammonium phosphate, wet-process phosphoric acid (54% $P_2O_5$), anhydrous ammonia, and potassium chloride. Thus, the preferred application of the present invention is in the commerical production of typical suspension fertilizers using these six basic materials. No limitations have been found with the use of these materials in applying thereto the practice of the present invention. Other common but less widely used fertilizer ingredients such as diammonium phosphate, micronutrient salts (e.g., zinc oxide), etc., may of course be included in the formulations of suspensions produced using sonic gelling of the channelized 2:1 suspending clay. Other suspending clays such as sodium bentonite (a swelling clay) are not suitable for gelling by the method of the present invention. It is thus critical that the invention be practiced only with channelized 2:1 clays such as attapulgite and sepiolite.

The principal criteria by which a suspension is judged as to its adequacy in preventing settling of fertilizer salt crystals are its measured viscosity and gel strength. The gel strength, as mentioned supra, is a measure of how much shear stress must be applied before the gel yields and flow begins. One common method of measuring gel strength is to suspend a bob in a suspension sample by means of a length of fine wire and measure the amount of torque that must be applied in order to achieve rotation of the bob. This method was reported by Davenport et al of the Tennessee Valley Authority, "Gel Strength Measurement and Gel Characteristics Studied," in Fertilizer Solutions Magazine, Jan.–Feb. 1978. See also, TVA reprint Z-49, reprinted from the proceedings of TVA Fertilizer Bulk Blending Conference, Aug. 1–2, 1973, "Quality Control in a Bulk Blending Plant," and J. G. Getsinger, F. P. Achorn, and George Hoffmeister "Fluid Fertilizers," TVA Bulletin Y-185, pp. 86–87, (1984). The units of the gel strength in the above measurement are gram-centimeters, it being understood that gram, in this case, is used as a force unit rather than a mass unit. A minimum value of gel strength that is generally considered acceptable for most suspensions is about 2 gram-centimeters.

Suspension fertilizers are also evaluated in the laboratory for viscoisity to indicate their ability to flow. The viscosity generally is measured with a viscometer such as a Brookfield Model RVT. Note: Although a number of devices and/or materials may be referred to infra by means on their respective tradenames and/or trademarks, no endorsement of same is herein intended, or to be construed, thereby. Before measuring the viscosity, all fluid fertilizers are agitated for 5 minutes with a stirrer operated at a propeller-tip speed of 7 feet (2.1 m) per second. For fluids that are to be applied directly to the soil, the viscosity must not exceed 800 centipoises at 80° F. and 900 centipoises at 32° F. The viscosity of base fluids that are primarily for use in production of fluid blends must not exceed 1,000 centipoises at 80° F., 1,500 centipoises at 32° F., or 2,000 centiposies at 0° F. Field tests [TVA Bulletin Y-185, Fluid Fertilizers, pp. 17–18, (1984)]have shown that fluids blends which do not meet the above viscosity specifications usually cannot be uniformly applied to the soil, and base suspensions that do not meet these viscosity specifications usually cannot be satisfactorily drained from storage tanks or transferred from one container to another by pumping.

When no solids (other than the dispersed clay) are present, such as is the case with TVA's 31-0-0 grade (2% clay) UAN base suspension, for example, the gel strength is proportional to the viscosity. A good 31-0-0 grade with a viscosity of 250 centipoises, for example, would have a gel strength of about 10 gram-centimeters. The presence of fertilizer salt crystals, however, increases the measured viscosity and decreases the correlation between viscosity and gel strength.

In investigating the invention, the effect of power density (W/ml) on the time required, i.e., retention time, to obtain a specific level of gelling of the clay was investigated. Using the piezoelectric apparatus described in Example I infra, attapulgite clay was gelled by sonic energy in a UAN solution (3.0 weight percent clay) and in a 10-34-0 grade ammonium polyphosphate solution (2.0 weight percent clay). times were measured for the suspensions to reach a viscosity of 250 centipoises at various power density levels. The results are shown in FIGS. 2 and 3 supra. At less than about one W/ml, retention times up to 12 minutes were required. Between 1 and 2 W/ml, the required time decreased rapidly to about one minute. Further increasing the power density to 4 W/ml only reduced the time needed to obtain 250 centipoises to about 30 seconds. These results for both the UAN and the 10-34-0 grade were very similar. The attapulgite used in these tests was a commercial, gelling variety from the Georgia–Florida deposits.

Using the power density and retention time results shown in FIGS. 2 and 3 supra, it is possible to calculate the energy consumption of sonic gelling per unit of suspension produced. The results of this calculation are shown graphically as kilowatt-hour per ton versus retention time in FIG. 4. With the clay used in these tests, the energy required to reach 250 centipoises was constant at about 25 kilowatt-hours per ton from 0.5 to 1.0 minutes retention time and began increasing at longer retention times (and lower power densities). Together, these results indicate the critical ranges of the variables comprising the preferred embodiment of the invention.

EXAMPLES

In order that those skilled in the art may better understand how the present invention can be practiced, the following examples are given by way of illustration only and not necessarily by way of limitation, since numerous variations thereof will occur and will undoubtedly be made by those skilled in the art without substantially departing from the true and intended scope of the instant invention herein taught and disclosed.

The test described in all but one of the following examples were performed using a piezoelectric transducer operating at a frequency of 20 kilohertz. One test was made successfully using magnetostrictive transducers at 10 kilohertz. Other frequencies have not yet been tested, but there is no reason to expect that the frequency employed is particularly critical. Sonic cleaning equipment is commercially available, for example, at frequencies up to 40 kilohertz, and based on the analogy between sonic cleaning and breaking down of clay particles mentioned supra, it is not unreasonable to expect that a wide range of frequencies would work.

Additionally, all the following examples were performed batchwise rather than by continuous processing. As would be obvious to one skilled in the art, however, converting the practice of the instant invention to a continuous processing mode would require only the furnishing of inlet and outlet flow means, and means for control of flow rate, in order to continuously gel a clay-fluid mixture with the appropriate retention time.

EXAMPLE I

Tests were made to compare sonic gelling with mechanical gelling provided by a laboratory Waring blender. Test samples were prepared in 250-gram batches containing 242.5 grams of UAN liquid fertilizer to which 7.5 grams of attapulgite clay (Min-U-Gel 200) was added. This was accomplished by the following procedure, all carried out at room temperature. Samples for sonic tests were prepared by sifting the clay into the UAN over a 5-second period while the UAN was stirred lightly. Stirring was supplied by a 3-bladed (2-inch-diameter) propeller turning at a tip speed of 7 feet per second. Blender test samples were made by charging the UAN to the blender prior to addition of clay. The blender was started, operating at a tip speed of 40 feet per second, after which the dry clay (7.5 g) was sifted in over a 5-second period.

The sonic-gelled UAN suspensions were sheared with a piezoelectric horn-type transducer driven by a 400-watt generator with a variable power control. The transducer operated at a fixed frequency of 20 kilohertz. The samples containing the nongelled clay were charged to a 250-ml glass beaker. The sample volume of 187 ml had a diameter of 5.4 centimeters and a depth of 8.9 centimeters. The end of the cylindrical transducer horn (2.84 cm$^2$) was submerged to a depth of 0.6 cm during tests. The mechanical blender (1-quart size) of the typical laboratory Waring type, had a 4-bladed propeller which rotated at a tip speed of 40 feet per second during tests.

Suspensions were evaluated on the basis of apparent viscosity (centipoises), gel strength (g-cm), energy requirements (kilowatt-hours per ton), and production time (min). Apparent viscosity was measured with a Brookfield viscometer, Model RVT digital-type, operating at 100 revolutions per minute. Gel strength (g-cm) was measured with the gelometer instrument mentioned supra. A wattmeter was used to measure power requirements.

The tests were set up to compare, quantitatively, sonic and mechanical shear gelling of dry suspending clays in ionic fertilizer fluids. Typical results with UAN are shown in Table V, below.

TABLE V

Stabilization of UAN 32-0-0 Liquid Fertilizer with Dry Attapulgite Clay by Sonic and Mechanical Shear

| Gelling method | Min-U-Gel 200[1] clay, wt % | Gelling time required, minutes | Power, watts | Total energy, kWh/ton of product | Gel strength, g-cm | Viscosity, centipoises |
|---|---|---|---|---|---|---|
| Sonic | 3 | 1.25 | 313 | 23.7 | 11.9 | 296 |
| Mechanical | 3 | 70.00 | 125 | 529.3 | 11.4 | 312 |

[1]"As is" dry clay basis.

The data summarized in Table V above, illustrates that the sonic method of gelation, when utilized according to the method of the instant invention can be far superior to the prior art method of mechanical gelation in many respects, including requiring less power consumption and production time in producing a UAN suspension of comparable viscosity.

EXAMPLE II

A 10-23-0 grade liquid fertilizer phosphate solution, devoid of included particulates, was processed with the same equipment and procedures utilized in Example I, supra. The results of this series of tests are shown in Table VI, below.

TABLE VI

Stabilization of 10-34-0 Grade Liquid Fertilizer Containing Phosphate with Dry Attapulgite Clay by Sonic and Mechanical Shear

| Gelling method | Min-U-Gel 200[1] clay, wt % | Gelling time required, minutes | Power, watts | Total energy, kWh/ton of product | Gel strength, g-cm | Viscosity, centipoises |
|---|---|---|---|---|---|---|
| Sonic | 3 | 0.33 | 420 | 8.4 | 6.2 | 300 |
| Mechanical | 3 | 1.75 | 125 | 13.2 | 6.9 | 314 |

[1]"As is" dry clay basis.

The data reported in Table VI above reveal that while less total shear is required to gel clay in a phosphate liquid base than in UAN, less power and time are also required by the sonic method.

EXAMPLE III

This example illustrates the production of still another type of fertilizer suspension composition of our invention in that it contains both phosphate and solids in crystalline form. A 12-36-0 suspension was prepared in the same equipment and by use of the same procedure of Example I, supra. These results, which are generally similar to those of Example II, supra are illustrated in Table VII below.

TABLE VII

Stabilization of 12-36-0 Liquid Phosphate Fertilizer Containing Fine Crystalline Solids with Dry Attapulgite Clay by Sonic and Mechanical Shear

| Gelling method | Min-U-Gel 200[1] clay, wt % | Gelling time required, minutes | Power, watts | Total energy, kWh/ton of product | Gel strength, g-cm | Viscosity, centipoises |
|---|---|---|---|---|---|---|
| Sonic | 3 | 1.00 | 287 | 17.4 | 5.2 | 334 |
| Mechanical | 3 | 1.75 | 130 | 13.8 | 5.3 | 324 |

[1]"As is" dry clay basis.

As the twofold effect of phosphate ions and solids are shown here, in that mechanical shearing used slightly less power in attaining about the same viscosity as the sonic gelled product. Again, the time required by the sonic method was less than that by the mechanical method.

EXAMPLE IV

This example illustrates the production of a high solid 18-0-18 fertilizer suspension composition using the method of the instant invention. The product contained nitrogen solution (UAN) as the continuous phase and solution-grade potassium chloride (−28 mesh, 62% $K_2O$) as a partially dissolved solid phase. The suspension, which contained no phosphate, was prepared in equipment and by procedures similar to that used in Example I, supra. Results of this series of tests are shown in table VIII, below.

TABLE VIII

Stabilization of 18-0-18 Fluid Fertilizer Containing High Levels of Soluble Grade KCl Granules With Dry Clay by Sonic and Mechanical Shear

| Gelling method | Min-U-Gel 200[1] clay, wt % | Gelling time required, minutes | Power, watts | Total energy, kWh/ton of product | Viscosity, centipoises |
|---|---|---|---|---|---|
| Sonic | 3.0 | 1.5 | 430 | 39 | 530 |
| Mechanical | 3.0 | 20.0 | 130 | 157 | 442 |

[1]"As is" dry clay basis.

From the above data and that of previous examples, it should be readily apparent that the performance of the sonic method of gel formation is independent of the presence, in the fluid to be processed to the desired suspension, of solids and phosphate ions; whereas, the attainment of successful operation of the mechanical method is more highly dependent on the presence of phosphate ions than solids, and both phosphate ions and solids are required for the mechanical method to be comparable to the instant sonic method.

EXAMPLE V

Continuing the comparison of the two methods, this example is designed to show the effect of forming clay gels in a typical NPK fluid fertilizer. The fluid product contains nitrogen and phosphate from the 10-34-0 fluid of Example II, supra and a high level of suspended potassium chloride (−28) solids. The suspension product of 3-10-30 grade was prepared in the equipment and by the procedures utilized in Example I, supra with one exception, i.e., the clay level in this test contained 2 percent clay; whereas, the suspensions of the previous examples contained 3 percent clay. Results are given in Table IX below.

TABLE IX

Stabilization of a Typical NPK (3-10-30) Fluid Fertilizer with Dry Attapulgite Clay by Sonic and Mechanical Shear

| Gelling method | Min-U-Gel 200[1] clay, wt % | Gelling time required, minutes | Power, watts | Total energy, kWh/ton of product | Viscosity, centipoises |
|---|---|---|---|---|---|
| Sonic | 2 | 0.25 | 430 | 6.5 | 480 |
| Mechanical | 2 | 1.00 | 125 | 7.6 | 460 |

[1]"As is" dry clay basis.

Again, the data show the relative ease of sonic shearing in forming a gel. The presence of the phosphate ion and solids (to some degree) enhance the gel formation by mechanical means. However, sonic produced gels are formed independent of the presence of ions or solids in the suspension, at a faster production rate and with less consumption of power (See for purposes of such comparison, Examples I and II, supra).

EXAMPLES VI

While the most commonly used sonic transducers are of the piezoelectric type, as for example the ones used in the forgoing examples, a less commonly used sonic transducer of the "magnetostrictive" type is also commercially available. Accordingly, a magnetostrictive type transducer was tested, in the practice of the instant invention in this series of tests, to show in a broader spectrum the effect on clay gelling of both types of sonic transducers. In this example, 500-gram samples of UAN solution and 30 percent diammonium phosphate solution, each containing 2 percent nongelled attapulgite (Min-U-Gel 200) clay, were charged to a volume formed between two rectangular magnetostrictive transducer plates 5½ inches by 18 inches each in opposition to each other. The plates, separated by ¼-inch distance with the volume between them sealed on three sides, were each operated at a frequency of 10 kilohertz and driven by 250-watt generators. Results of these tests are shown in Table X below.

TABLE X

Stabilization of Liquid Fertilizer with Dry Attapulgite Clay by Magnetostrictive Induced Sonic Shear

| Fertilizer liquid type | Min-U-Gel 200[1] clay, wt % | Duration of test, minutes | Power, watts | Total energy, kWh/ton of product | Viscosity, centipoises |
|---|---|---|---|---|---|
| UAN | 2 | 3 | 500 | 14.8 | 180 |
| DAP | 2 | 3 | 500 | 14.8 | 320 |

[1]"As is" dry clay basis.

These tests are further indications of the value of using ultrasonic vibrations in general as a means to disperse and form clay gels in ionic media.

The above tests (Examples I to V) of our invention are intended to show by comparison and in general (Example VI) the relative efficiency of forming clay gels by utilizing ultrasonic emanations versus the rather low efficiency of mechanical methods now in practice. As is evident, the gist underlying the concept and practice of the instant invention, as well as the substantial advantages realized therefrom, are as follows: (1) substantially reduced power requirements; (2) substantially increased efficiency by which ultrasonic vibrations more fully utilize the full gel forming power of the clay; (3) substantially reduced production time; (4) substantially reduced need for bulky and costly motors, pumps recirculation lines, etc.; and (5) substantially less maintenance and downtime since ultrasonic transducers can operate full time for several years without malfunctions.

INVENTION PARAMETERS

After sifting and winnowing through the data supra, as well as other results and operations of our new, novel, and improved method for gelling hormite clays in fertilizer suspensions, the operating variables and preferred conditions for carrying out our process are summarized below.

| Operating Variables | Operating Limits | Preferred Limits |
|---|---|---|
| Retention time, min | 0.25-10 | 0.25-3.0 |
| Power density, W/ml | 1-5 | 1.2-4.6 |
| Percent clay | 1-4 | 1.5-3.0 |

While we have shown and described particular embodiments of our invention, modifications and variations thereof will occur to those skilled in the art. We wish it to be understood, therefore, that the appended claims are intended to cover such modifications and variations which are within the true scope and spirit of our invention.

What we claim as new and desire to secure by Letters Patent of the United States is:

1. In an improved process for effecting production of suspension fertilizer product, said suspension fertilizer product having high plant food contents, high available N or $P_2O_5$ or both, excellent flow properties, relatively low initial viscosities of greater than about 250 centipoises, and excellent long term storage properties including post storage viscosities of less than about 1,000 centipoises, comprising the steps of:

(a) introducing a stream of fluid fertilizer material into reactor means, said fluid fertilizer material comprising from about 96 percent to about 99 percent by weight of the materials introduced thereinto;

(b) introducing a stream of gelling channelized 2:1 clay material into said reactor means, said gelling channelized 2:1 clay material ranging from about 1 percent to about 4 percent by weight of the material introduced thereinto;

(c) subjecting the mixture of said fluid fertilizer material and said clay material resulting from the introduction of streams thereof into said reactor means to agitation to effect a resulting suspension fertilizer therein; and (d) removing at least a portion of the resulting suspension fertilizer from said reactor means as product;

the improvement in combination therewith for more efficiently imparting energy to the particles of clay material so as to cause said particles to be physically broken and deagglomerated into their component individual needlelike crystals thereby effecting the formation of a gel characterized by its capability to both cause an increase in the viscosity of the resulting suspension and to minimize the settling of particles therein during storage, said particles ranging upwards to about 20 mesh in size, which improvement in combination therewith comprises the additional step of:

(1) providing agitation in step (c) supra for a period of time ranging from about 0.25 to about 10 minutes by operatively connecting ultrasonic energy output transducer means with said mixture, said transducer means operating at a frequency ranging from about 10 to about 40 kilohertz and at an energy output level sufficient to impart to said mixture an average power density ranging from about 1 to about 5 W/ml;

said improved process characterized by the fact that the total energy, per unit of product produced, necessary to supply said ultrasonic induced agitation in step (1) supra ranges from about 5 to about 100 percent of that which would otherwise be required to provide agitation through the utilization of conventional mechanical means for imparting shear energy thereto.

2. The improved process of claim 1 wherein said fluid fertilizer material introduced into said reactor means in step (a) thereof comprises an ionic solution, and wherein said improved process is further characterized by the fact that the total energy, per unit of product produced, necessary to supply said agitation in step (1) thereof is reduced by at least one order of magnitude as compared to the energy requirement necessary when agitation is supplied by means of application of said mechanical shear energy thereto.

3. The improved process of claim 1 wherein the quantity of clay material introduced into step (b) thereof ranges from about 1.5 to about 3.0 percent by weight, wherein said agitation in step (1) thereof is effected over a time ranging from about 0.25 to about 3 minutes, and wherein said power density in W/ml in step (1) thereof ranges from about 1.2 to about 4.6.

4. The improved process of claim 2 wherein the quantity of clay material introduced ranges from about 1.5 to about 3.0 percent by weight, wherein said substantial agitation is effected over a time ranging from about 0.25 to about 3 minutes, and wherein said power density in W/ml thereof ranges from about 1.2 to about 4.6.

* * * * *